(12) United States Patent
Ebina et al.

(10) Patent No.: US 9,914,194 B2
(45) Date of Patent: Mar. 13, 2018

(54) METHOD AND DEVICE FOR GRINDING METAL ANNULAR MEMBER

(71) Applicant: NSK Ltd., Shinagawa-ku, Tokyo (JP)

(72) Inventors: Takeshi Ebina, Fujisawa (JP);
Mitsuharu Ozawa, Fujisawa (JP);
Tomoki Ogasahara, Fuijsawa (JP)

(73) Assignee: NSK LTD., Tokyo (JP)

( * ) Notice: Subject to any disclaimer, the term of this patent is extended or adjusted under 35 U.S.C. 154(b) by 349 days.

(21) Appl. No.: 14/758,130

(22) PCT Filed: Dec. 17, 2013

(86) PCT No.: PCT/JP2013/083786
§ 371 (c)(1),
(2) Date: Jun. 26, 2015

(87) PCT Pub. No.: WO2014/103806
PCT Pub. Date: Jul. 3, 2014

(65) Prior Publication Data
US 2015/0343598 A1    Dec. 3, 2015

(30) Foreign Application Priority Data

Dec. 25, 2012  (JP) .................................. 2012-280550

(51) Int. Cl.
*B24B 49/04* (2006.01)
*B24B 5/35* (2006.01)
(Continued)

(52) U.S. Cl.
CPC .............. *B24B 5/355* (2013.01); *B24B 5/04* (2013.01); *B24B 5/35* (2013.01); *B24B 49/04* (2013.01);
(Continued)

(58) Field of Classification Search
CPC .. B24B 49/04; B24B 5/04; B24B 5/35; B24B 5/355; G05B 19/182; G05B 2219/45161
(Continued)

(56) References Cited

U.S. PATENT DOCUMENTS 3,703,054 A    11/1972  Uhtenwoldt
4,926,337 A *   5/1990  Gile ....................... B23Q 3/183
                                                279/133
(Continued)

FOREIGN PATENT DOCUMENTS

EP    2 181 802 A1    5/2010
GB    2 017 545 A    10/1979
(Continued)

OTHER PUBLICATIONS

International Search Report of International Patent Application No. PCT/JP2013/083786, dated Apr. 1, 2014.
(Continued)

*Primary Examiner* — Chun Cao
(74) *Attorney, Agent, or Firm* — Shapiro, Gabor and Rosenberger, PLLC

(57) ABSTRACT

Provided is a grinding method capable of preventing variation in the outer diameter of a processed object 1 at the completion of grinding regardless of change in the amount of elastic deformation of the processed object 1 based on the change in the cutting ability of a grindstone 4. The outer diameter D of the processed object 1 during grinding is measured by gauge heads 5 in process. Plural target values $D_i$ that differ from each other are set for the outer diameter D of the processed object 1, and first threshold values are set for the rate of change of the outer diameter D of the processed object for each of these target values $D_i$. Spark out is started when the outer diameter D of the processed object 1 becomes equal to a target value $D_i$ and the absolute value
(Continued)

of the rate of change v is greater than a first threshold value that corresponds to the target value $D_t$.

4 Claims, 7 Drawing Sheets

(51) Int. Cl.
    *G05B 19/18*     (2006.01)
    *B24B 5/04*     (2006.01)
(52) U.S. Cl.
    CPC .. *G05B 19/182* (2013.01); *G05B 2219/45161* (2013.01)
(58) Field of Classification Search
    USPC .......................................................... 700/164
    See application file for complete search history.

(56) References Cited

U.S. PATENT DOCUMENTS

| | | | | |
|---|---|---|---|---|
| 5,562,523 A | * | 10/1996 | Asano | ...................... B24B 49/04 451/1 |
| 5,562,526 A | | 10/1996 | Yoneda et al. | |
| 6,419,563 B1 | * | 7/2002 | Ido | ............................ B24B 5/42 451/49 |
| 8,287,329 B2 | * | 10/2012 | Yonezu | ...................... B24B 5/04 451/49 |

FOREIGN PATENT DOCUMENTS

| | | | |
|---|---|---|---|
| JP | 1-171743 | A | 7/1989 |
| JP | 6-278019 | A | 10/1994 |
| JP | 6-335858 | A | 12/1994 |
| JP | 09-314439 | | * 12/1997 |
| JP | 09-314439 | A | 12/1997 |
| JP | 2000-158292 | A | 6/2000 |
| JP | 2000-343425 | A | 12/2000 |
| JP | 2001-269864 | A | 10/2001 |
| JP | 2003-094335 | A | 4/2003 |
| JP | 3413938 | B2 | 4/2003 |
| JP | 2005-59141 | A | 3/2005 |
| JP | 2005-059141 | A | 3/2005 |
| JP | 2012-143843 | A | 8/2012 |

OTHER PUBLICATIONS

Written Opinion of the International Searching Authority for International Patent Application No. PCT/JP2013/083786, dated Apr. 1, 2014.
Extended European Search Report dated Jan. 31, 2017, in European Patent Application No. EP13869417.9.

* cited by examiner

METHOD AND DEVICE FOR GRINDING METAL ANNULAR MEMBER

TECHNICAL FIELD

The present invention relates to a method and device that uses a rotating grindstone for grinding the circumferential surface of a metal annular member that is being processed.

BACKGROUND ART

A grinding process is performed on the circumferential surfaces of metal annular members such as the raceway surfaces of race members of a radial rolling bearing, or cylindrical shaped fitting surfaces in order to improve the surface precision or surface roughness. As illustrated in FIG. 1A and FIG. 1B, this grinding process is performed using a grinding device. The grinding device normally comprises: a rotating drive shaft (not illustrated in the figures); a backing plate 2 that is fastened to the tip-end section of the rotating drive shaft, and that magnetically affixes an annular processed object (work) 1 on the end surface thereof; at least two shoes 3 for making it possible to position the processed object in the radial direction; a rotating grindstone 4 that grinds the outer-circumferential surface or inner-circumferential surface of the processed object 1; a contact sensor or non-contact sensor (not illustrated in the figures) that comprises at least two gauge heads 5 and that measures the outer diameter D of the processed object 1; and a controller (not illustrated in the figures) for controlling the feed speed of the grindstone 4 based on the obtained measurement results. The grinding process is performed in a state in which the processed object 1 is positioned in the radial direction by supporting and fastening the processed object 1 to the backing plate 2, and bringing the shoes 3 into sliding contact with the outer-circumferential surface of the processed object 1. At the same time, the feed speed of the grindstone 4 is suitably controlled by measuring the outer diameter D at two locations on opposite sides in the radial direction of the outer-circumferential surface of the processed object 1 that is being ground in process by the sensor and feeding the measurement results back to the controller.

More specifically, the grinding of a metal annular member is performed in the order of rough grinding, finish grinding and spark out. In rough grinding and finish grinding, the feed speed of the grindstone 4 (feed amount/time) is reduced in stages. Then, when the outer diameter D of the processed object 1 that is calculated based on the values measured by the gauge heads 5 becomes a target dimension, the feed speed of the grindstone 4 is set to "0", and spark out begins. Spark out is a process of grinding the circumferential surface of the processed object 1 in a state in which the feed speed of the grindstone 4 is "0", and by only the circumferential surface of the processed object 1 pressing against the surface of the grindstone 4 due to elastic restoration of the processed object 1. After a specified amount of time (sufficient time for the sparks and grinding sound from the contact area between the outer-circumferential surface of the processed object 1 and the surface of the grindstone 4 to stop, and for the outer-circumferential surface of the processed object 1 to become smooth) has elapsed, the grindstone 4 is caused to displace in a direction away from the outer-circumferential surface of the processed object 1, and grinding ends.

In this kind of grinding process, the processed object 1 is elastically deformed from the state illustrated in FIG. 7A to an elliptical shape as exaggeratedly illustrated in FIG. 7B by pressing the grindstone 4 against the processed object 1 in the rough grinding process, and the processed object 1 is elastically restored in the processing after that (finish grinding and spark out). The elastic deformation of the processed object 1 becomes more prominent the lower the rigidity is of the processed object 1. Here, in order to avoid interference with the grindstone 4, the installation positions of the gauge heads 5 are normally shifted about 90° in the circumferential direction from the contact position between the processed object 1 and the grindstone 4. Therefore, the outer diameter D of the processed object 1 that is measured by the gauge heads 5 becomes larger than the outer diameter in the free state (state in which the outer-circumferential surface is not pressed by the shoes 3 and grindstone 4, and elastic deformation is released). As a result, by performing spark out after the outer diameter D of the processed object 1 has been processed to the target dimension, the amount of grinding becomes excessive, and the outer diameter in the free state of the processed object 1 that is obtained becomes smaller than the target dimension.

For example, it can be considered to make the feed speed of the grindstone 4 "0" in a state in which the outer diameter D of the processed object 1 that is measured by the gauge heads 5 is larger than the original target dimension and perform spark out for a specified amount of time such that the outer diameter in the free state of the processed object 1 may be made as a target dimension. However, the amount of elastic deformation of the processed object 1 fluctuates due to the cutting ability of the grindstone 4 and the like. In other words, as the cutting ability of the grindstone 4 degrades, the amount of elastic deformation of the processed object 1 becomes larger, and the better the cutting ability of the grindstone 4 is, the smaller the amount of elastic deformation of the processed object 1 becomes.

Therefore, even when spark out is performed for just a specified amount of time from a state in which the outer diameter D of the processed object 1 is larger than the target dimension, when the cutting ability of the grindstone 4 is worse than a set value, and the amount of elastic deformation of the processed object 1 is greater than a set value, the amount of elastic restoration of the processed object 1 becomes large, and the amount of grinding during spark out becomes excessive, so the outer diameter D of the processed object 1 becomes smaller than the target dimension. Conversely, when the cutting ability of the grindstone 4 is better than a set value, the amount of elastic restoration of the processed object 1 during spark out becomes less than a set value, and the amount of grinding of the outer-circumferential surface of the processed object 1 by spark out becomes less than a set value, so the outer diameter D in the state after grinding of the processed object 1 is complete becomes larger than the target dimension. When the outer diameter D at the end of spark out of the processed object 1 is larger than the target dimension, it is feasible to make the outer diameter of the processed object 1 the target dimension by further performing step-feed grinding of the processed object 1 as illustrated in FIG. 8 in which the feed speed of the grindstone 4 and the amount of cutting are very small. However, by adding this process, there is a possibility that the time and work of processing, and the manufacturing cost will increase.

Moreover, when the amount of elastic deformation of the processed object 1 is less than a set value, and the amount of elastic restoration of the processed object during spark out is small, the time required for releasing the elastic deformation of the processed object 1 during spark out will be short. However, in the case of conventional construction, the amount of time that spark out is performed is set, based on the set value of the cutting ability of the grindstone 4, to an amount of time sufficient for sparks and grinding noise from the area of contact between the outer-circumferential surface of the processed object 1 and the surface of the grindstone 4 to stop, and for the outer-circumferential surface of the processed object 1 to become smooth. Therefore, when the cutting ability of the grindstone 4 is better than a set value, the amount of time that spark out is performed and the overall amount of time that grinding is performed becomes unnecessarily long.

In regard to this, JP 2000-343425 (A) discloses a method of learning the starting point for spark out (timing at which grinding changes from finish grinding to spark out) from the amount of change in the outer diameter per one rotation of the processed object 1 at the end of spark out, and then adjusting the starting point of spark out in the next grinding after this learning is complete. Moreover, JP 2012-143843 (A) discloses a method of adjusting the feed speed of the grindstone in the next grinding process that is performed after that learning based on the amount of time required for making the outer diameter of the processed object the target dimension. However, in the case of the methods disclosed in the literature above, when variation occurs in the grinding process due to changes in the cutting ability of the grindstone and the like, there is a possibility that the learning will not converge.

RELATED LITERATURE

Patent Literature

[Patent Literature 1] JP 2000-343425 (A)
[Patent Literature 2] JP 2012-143843 (A)

SUMMARY OF INVENTION

Problem to be Solved by Invention

Taking into consideration the problems described above, the object of the present invention is to provide a grinding method that is able to prevent variation in the outer-diameter dimension of a processed object at the completion of spark out, and prevent the amount of time that grinding is performed from becoming unnecessarily long, regardless of change in the amount of elastic deformation of the processed object due to change in the cutting ability of the grindstone and the like.

Means for Solving Problems

The present invention relates to a method for grinding a metal annular member, the method comprising a step of grinding a circumferential surface of a metal annular processed object using a rotating grindstone while measuring a dimension in a radial direction of the processed object in process, the grinding being performed so that after a rough grinding performed at a specified feed speed of the rotating grindstone, a finish grinding is performed by slowing the feed speed of the rotating grindstone, and then a spark out is performed by making the feed speed of the rotating grindstone '0'.

Particularly, in the method for grinding a metal annular member of the present invention, a condition for at least one of starting the spark out (switching from the finish grinding to the spark out) or ending the spark out is determined based on a rate of change of the dimension in the radial direction of the processed object, which is an amount of change in the dimension in the radial direction per unit time or per one rotation of the processed object.

More specifically, in the finish grinding, a first threshold value for the rate of change of the dimension in the radial direction of the processed object is determined for each of a plurality of different preset target values for the dimension in the radial direction of the processed object. When the dimension in the radial direction of the processed object becomes one target value of the plurality of different preset target values, the spark out starts (grinding switches from the finish grinding to the spark out) under a condition that an absolute value of the rate of change of the dimension in the radial direction of the processed object becomes greater than the first threshold value that corresponds to the one target value.

Preferably, the spark out ends when during the spark out an absolute value of the rate of change of the dimension in the radial direction of the processed object becomes less than a second preset threshold value.

Moreover, the present invention relates to a device for grinding a metal annular member. The device for grinding a metal annular member of the present invention comprises: a means for supporting and fastening a processed object and rotating the processed object; a means for positioning the processed object in a radial direction; a rotating grindstone grinding a circumferential surface of the processed object; a sensor measuring an outer diameter of the processed object; and a controller controlling a rotation of the rotating grindstone based on a measurement result measured by the sensor; the device executing the method for grinding a metal annular member of the present invention.

In other words, in the device for grinding a metal annular member of the present invention, the controller determines at least one of a timing for starting the spark out or a timing for ending the spark out based on the rate of change of the dimension in the radial direction of the processed object. Preferably, when the dimension in the radial direction of the processed object becomes the one target value of the plurality of different preset target values for the dimension in the radial direction of the processed object, the controller compares the absolute value of the rate of change of the dimension in the radial direction of the processed object with one of first threshold values for the rate of change of the dimension in the radial direction of the processed object that are determined for the plurality of different preset target values for the dimension in the radial direction of the processed object, the one first threshold value corresponding to one of the target values at a particular time, and starts the spark out under a condition that the absolute value of the rate of change of the dimension in the radial direction of the processed object is greater than the one first threshold value corresponding to the one target value at the particular time. Moreover, preferably, the controller ends the spark out when the absolute value of the rate of change of the dimension in the radial direction of the processed object becomes less than a second preset threshold value.

Effect of Invention

With the method and device for grinding a metal annular member of the present invention, it is possible to prevent variation in the outer diameter of a processed object at the completion of grinding regardless of change in the amount of elastic deformation of the processed object based on the change in the cutting ability of a grindstone, and prevent the time required for grinding from becoming unnecessarily long. In other words, in the present invention, the condition of at least one of the start of spark out or the end of spark out in the grinding process is set based on the rate of change of the dimension in the radial direction, which is the amount of change of the dimension in the radial direction of the processed object per unit time or per one rotation of the processed object. Therefore, it is possible to perform spark out while taking into consideration the amount of elastic deformation of the processed object.

MODES FOR CARRYING OUT INVENTION

Figure 1:
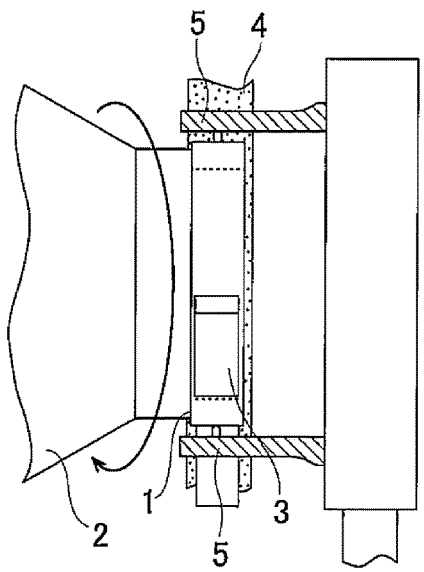
FIG. 1A shows a side view illustrating the state of performing grinding of a processed object by an example of a grinding device to which the present invention is applied.
FIG. 1B shows an end view as seen from the right in FIG. 1A of the state illustrated in FIG. 1A.
Figure 1:
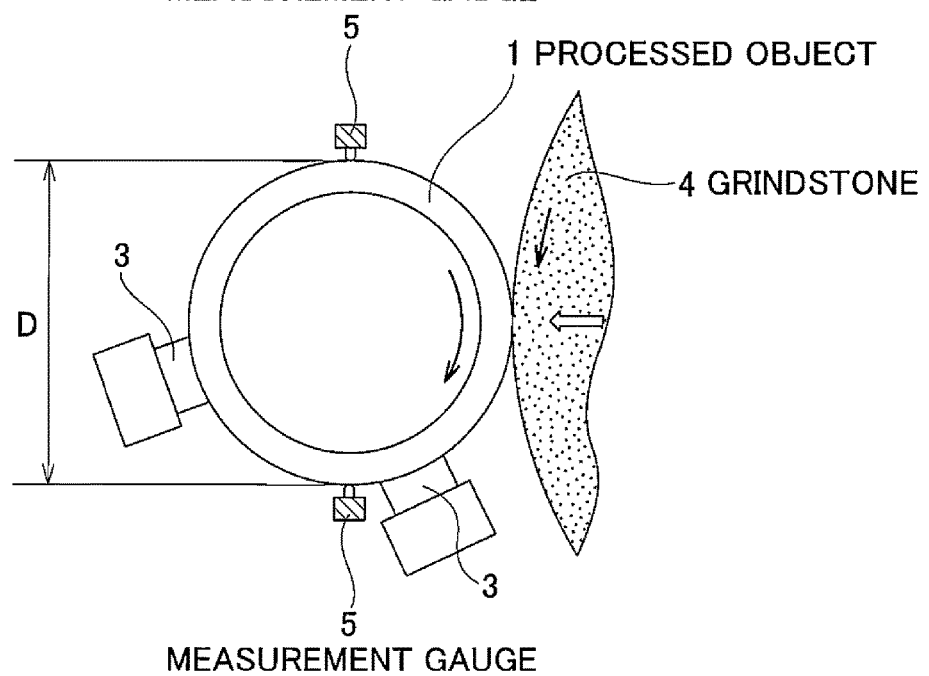

FIG. 1A to FIG. 6 illustrate an example of an embodiment of the present invention. A feature of this example is that, by suitably setting the timing at which spark out begins (change from finish grinding to spark out) and ends in the grinding process, the outer diameter D of a processed object (work) 1 is suppressed from varying in the completed state of processing, and the time required for grinding is prevented from becoming unnecessarily long regardless of change in the amount of elastic deformation of the processed object 1 due to a change in the cutting ability of the grindstone 4. The grinding device of this example is basically the same as the construction of a conventional grinding device and comprises: a rotating drive shaft (not illustrated in the figure) that supports and secures a processed object and causes that processed object to rotate; a backing plate 2 that is fastened to the tip end of this rotating drive shaft and magnetically affixes an annular processed object (work) 1 to the end surface thereof; two shoes 3 that position the processed object 1 in the radial direction; a rotating grindstone 4 that grinds the outer-circumferential surface of the processed object 1; a sensor (not illustrated in the figure) that comprises at least two gauge heads 5 and measures the outer diameter D of the processed object 1; and a controller (not illustrated in the figure) that controls the rotation of the rotating grindstone 4 based on the measurement results measured by the sensor. As a means for supporting, securing and rotating the processed object 1, it is possible to use a combination of a rotating drive shaft, and a known chuck device such as a mechanical chuck or magnetic chuck that can be attached to the rotating drive shaft, and that can support and secure the processed object 1 on the rotating drive shaft. Moreover, as a means for positioning the processed object 1 in the radial direction, it is also possible to use rollers and the like, or use a combination of an arbitrary number of rollers and shoes. As a sensor for measuring the outer diameter D of the processed object 1, it is possible to use a contact displacement sensor that uses contacts as the gauge heads 5, or it is possible to use a non-contact sensor that uses laser lights as the gauge heads 5.

The method of grinding in this example, including the method of grinding a processed object 1 using a grindstone 4, is the same as the basic processing in the conventional method. In other words, in the grinding process of this example, the outer-circumferential surface of the processed object 1 is grinded using a rotating grindstone 4 while measuring the dimension in the radial direction of the processed object 1 in process, and the grinding process is performed on the outer-circumferential surface of the processed object 1 in the order: a rough grinding, a finish grinding and a spark out. More specifically, the outer diameter D of the processed object 1 can be measured in process by two gauge heads 5, and the controller switches from the rough grinding to the finish grinding when the outer diameter D of the processed object 1 that is measured by the gauge heads 5 reaches a specified value.

A feature of the controller in this example is that the controller determines both the start and end of spark out based on the rate of change v ($\mu$m/s), which is the amount of change per unit time of the outer diameter D of the processed object 1 that is measured by the gauge heads 5. More specifically, in order for the controller to determine the timing of the start of spark out (timing at which grinding is switched from the finish grinding to the spark out), plural (for example, 5 to 6) target values $D_i$ are set in advance for the outer diameter D of the processed object 1. When the number of target values is 5, the value i is a natural number that is no less than 1 and no greater than 5 ($1 \leq i \leq 5$), and the target values $D_i$ are set so that $D_1 > D_2 > \ldots > D_5$. Furthermore, first threshold values $v_i$ are set for the rate of change of the outer diameter D of the processed object 1 for each of these target values $D_i$. Target values $D_i$ and first threshold values $v_i$ such as these are found by testing or calculation in advance according to the shape and material of the processed object 1. In other words, the target values $D_i$ and the first threshold values $v_i$ change according to the shape and material of the processed object 1.

Figure 3:
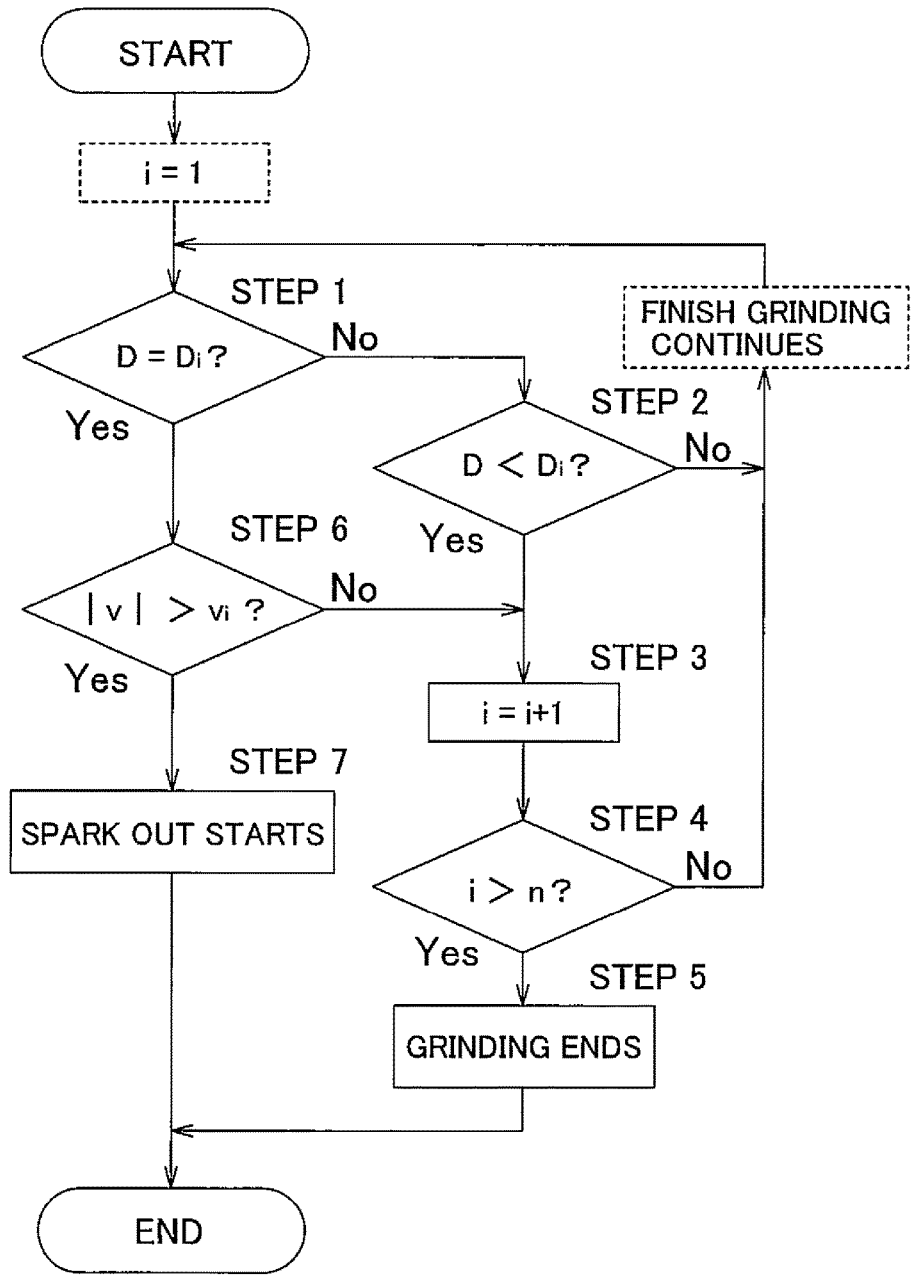
FIG. 3 shows a flowchart that illustrates the processing for determining the timing for the start of spark out in this example.

The method by which the controller determines the timing for starting spark out based on the rate of change v of the outer diameter D of the processed object 1 will be explained with reference to the flowchart in FIG. 3. The work illustrated in this flowchart is executed by the controller from the start of finish grinding to the start of spark out, or until the end of grinding when suitable timing for starting spark out cannot be determined.

First, in step 1, the controller determines whether or not the outer diameter D of the processed object 1 that is measured by the gauge heads 5 at that instant is the same as the target value $D_i$ (whether or not the outer diameter D is within a specified range with the target value $D_i$ being the center value). The initial value of the value i is taken to be 1 (i=1). When the outer diameter D is not equal to the target value $D_i$ ($D \ne D_i$), processing advances to step 2, and the controller determines whether or not the outer diameter D is less than the target value $D_i$ ($D<D_i$). In step 2, when the outer diameter D is equal to or greater than the target value $D_i$ ($D \ge D_i$) (however, the case in step 1 in which these values are the same ($D=D_i$) is excluded), finish grinding continues, and after a specified amount of time, processing returns to step 1. When the outer diameter D is less than the target value $D_i$ ($D<D_i$), processing advances to step 3, and the value i is increased by 1, after which processing advances to step 4. In step 2 and step 3, when the outer diameter D is less than the target value $D_i$ ($D<D_i$), the outer diameter does not become equal to the target value $D_i$ even when finish grinding is continued after that, so this work is a process for making the target value $D_i$ that is used for comparison with the outer diameter D a value $D_{i+1}$, which is value that is one step smaller.

In step 4, the controller determines whether or not the value i is equal to or less than the number (total number) n of target values $D_i$. When the value i is greater than the number n of target values $D_i$ (i>n), processing advances to step 5, grinding of the processed object 1 ends and since suitable timing for starting spark out could not be determined, the controller issues a warning from a display such as a buzzer or warning light. When the value i is equal to or less than the number n of target values $D_i$ (i≤n), then after a specified amount of time has elapsed, processing returns to step 1. In other words, step 4 and step 5 are performed in the procedure from step 1 to step 6 described later, and when suitable timing for staring spark out could not be determined by comparing the outer diameter D of the processed object 1 with the minimum target value $D_n$ of the target values $D_i$, this procedure becomes a procedure for ending grinding in error (exception process).

On the other hand, in step 1, when the outer diameter D is the same as the target value $D_i$ ($D=D_i$), processing advances to step 6, and the controller determines whether or not the absolute value of the rate of change v of the outer diameter D of the processed object 1 at that instant is greater than the first threshold value $v_i$ that corresponds to the target value Di. When the absolute value of the rate of change v is greater than the first threshold value $v_i$ ($|v|>v_i$), processing advances to step 7, the controller starts spark out (the feed speed of the grindstone 4 is made "0") and ends the procedure for determined the timing for starting spark out. When the absolute value of the rate of change v is equal to or less than the first threshold value $v_i$ ($|v| \le v_i$), processing advances to the procedure from step 3 to step 4, after which the controller performs processing according to the procedure described above.

Figure 4:
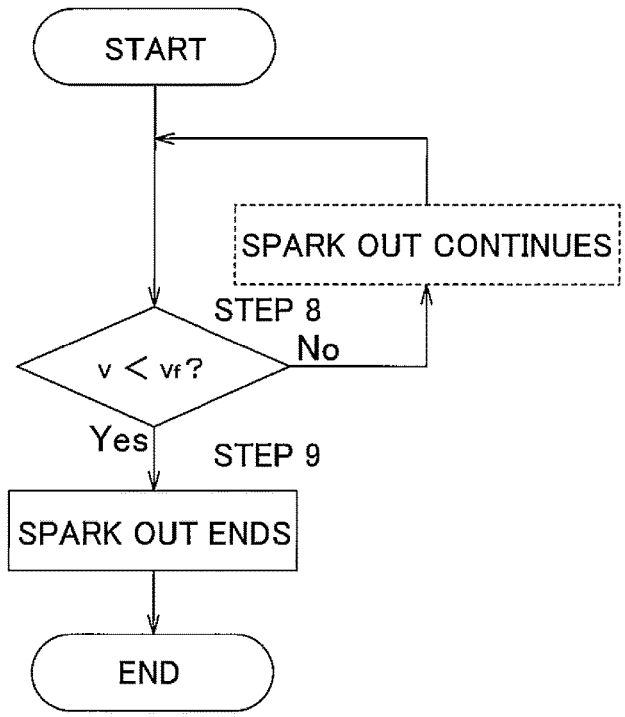
FIG. 4 shows a flowchart that illustrates the processing for determining the timing for the end of spark out in this example.

After spark out has started, the controller determines the timing for ending spark out according to the procedure illustrated in FIG. 4. The work illustrated in the flowchart in FIG. 4 is executed by the controller from after the start of spark out until spark out ends. First, in step 8, the controller determines whether or not the absolute value of the rate of change v is less than a second preset threshold value $v_f$ that was set in advance at specified periods of time (fixed time). Then, when the absolute value of the rate of change v becomes less than the second threshold value $v_f$ ($|v|<v_f$), processing advances to step 9, and the controller ends spark out. On the other hand, when the absolute value of the rate of change v is equal to or greater than the second threshold value $v_f$ ($|v| \ge v_f$), spark out continues without ending, and after a specified amount of time elapses, processing returns to step 8. The second threshold value $v_f$ is found by experimentation or calculation in advance. When it is particularly necessary to keep the tolerances of dimensions small (for example, 1 µm or less), then after spark out has ended, it is also possible to perform step-feed grinding of the processed object 1 in which the feed speed of the grindstone 4 and the cutting amount of grindstone 4 are very small in order to make the outer diameter D of the processed object equal to the target dimension.

Figure 2:
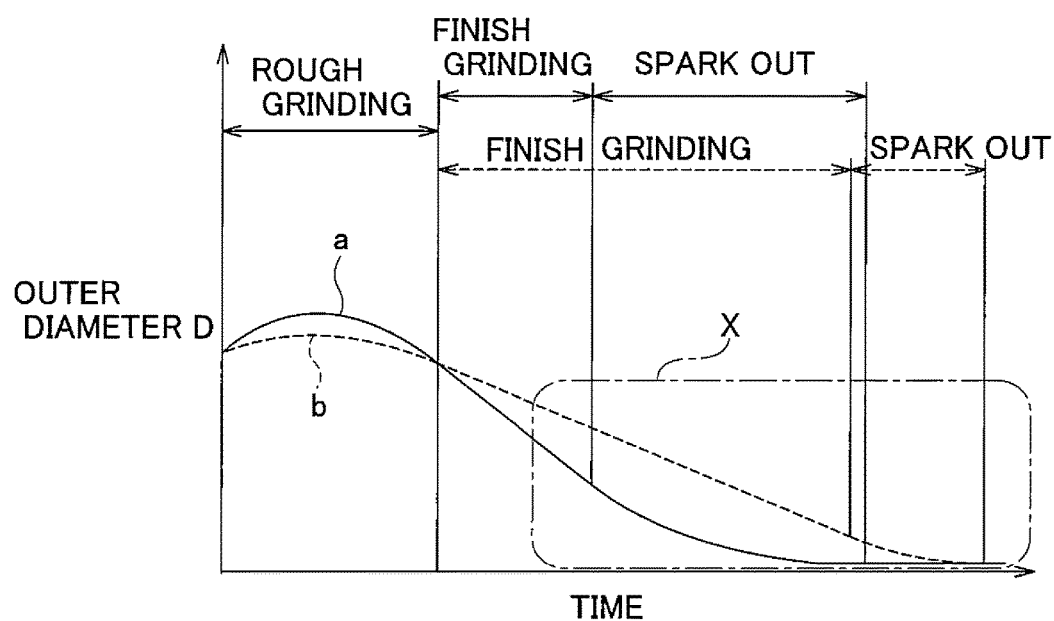
FIG. 2 shows a graph illustrating an example of change in the outer diameter of a processed object during grinding in an example of an embodiment of the present invention.
Figure 5:
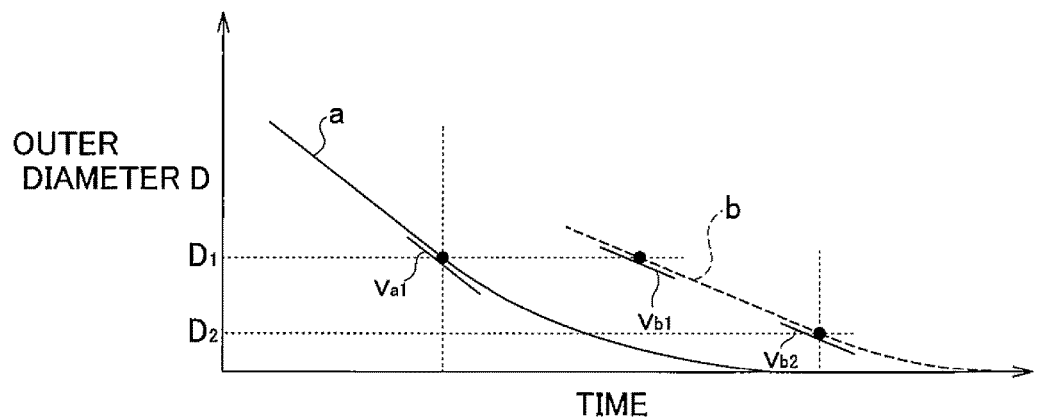
FIG. 5 shows a view that corresponds to an enlarged view of section X in FIG. 2.
Figure 6:
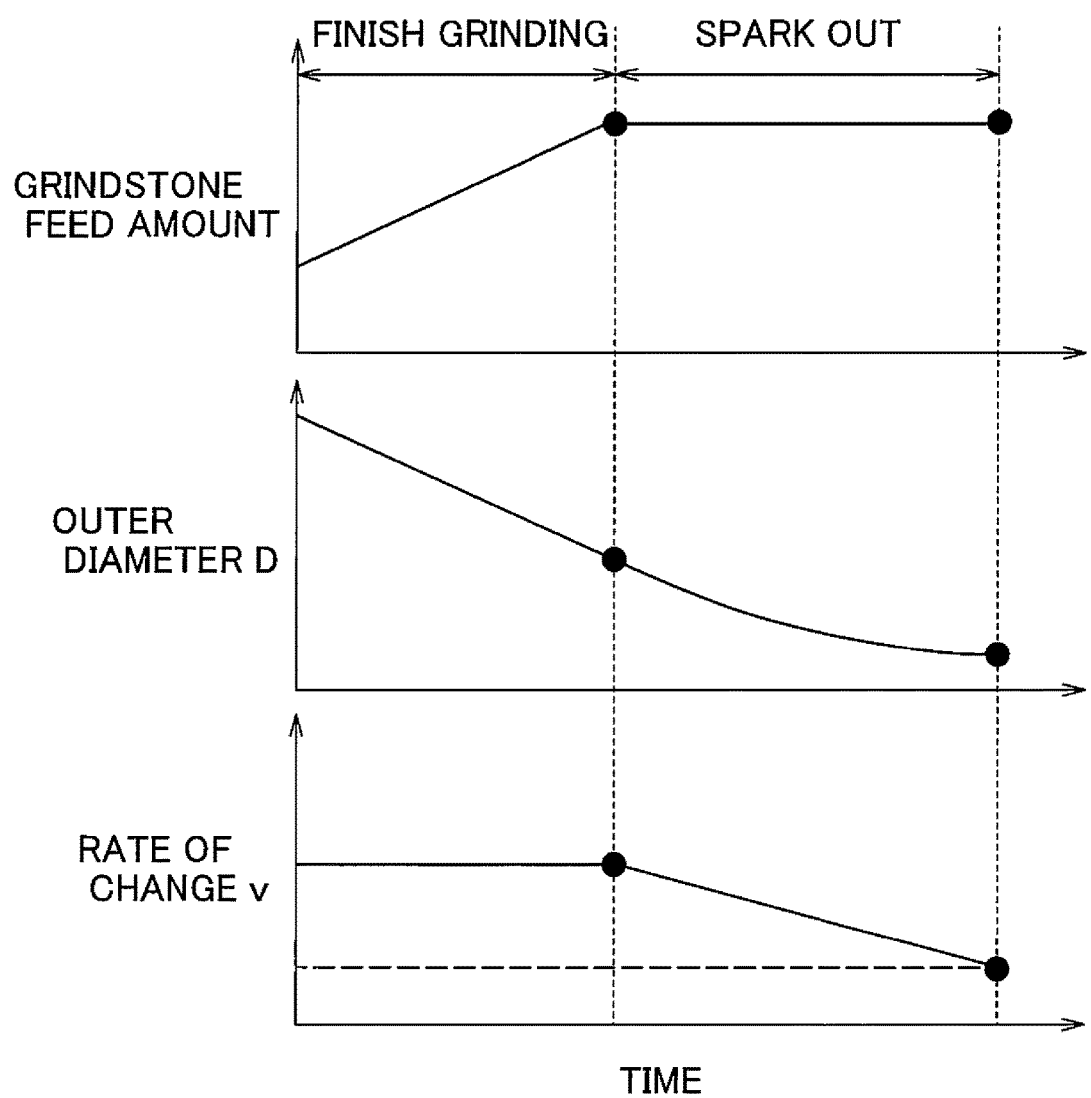
FIG. 6 shows a graph illustrating an example of the feed amount of a grindstone, the outer diameter D of a processed object, and the change in the rate of change v of the outer diameter D during grinding in this example.
Figure 7:
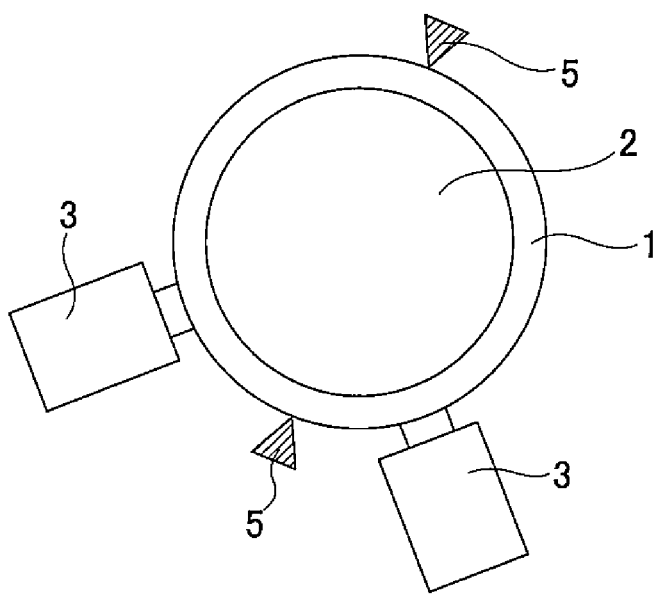
FIG. 7A shows a side view illustrating the state before the grindstone is pressed against a processed object that is supported by a grinding device of conventional technology.
FIG. 7B shows a side view exaggeratedly illustrating the state when the grindstone is pressed against a processed object.
Figure 7:
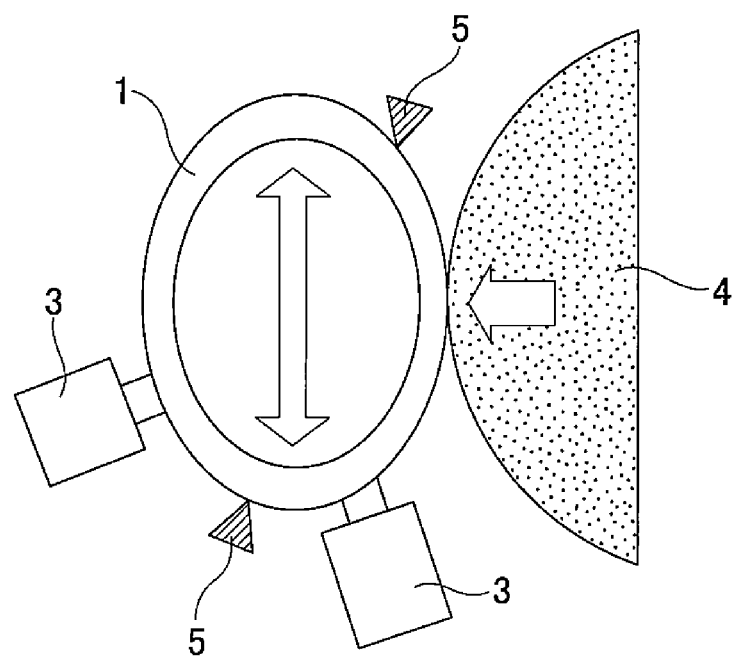
Figure 8:
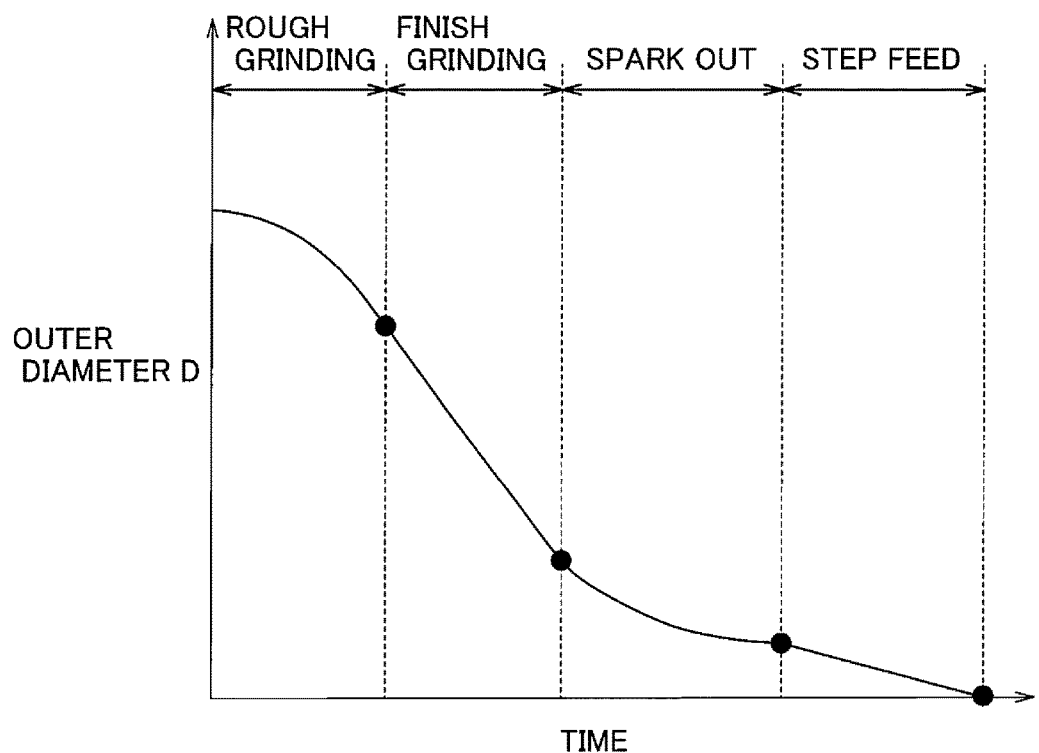
FIG. 8 shows a graph illustrating an example of the change in the outer diameter of a processed object due to grinding in conventional technology.

With the method for grinding a metal annular member of the present invention, even when variation occurs in the amount of elastic deformation of the processed object 1 based on the change in the cutting ability of the grindstone 4, it is possible to prevent the outer diameter of the processed object 1 at the end of spark out from varying, and it is possible to prevent the time required for grinding from become unnecessarily long. In other words, in this example, in order to determine the timing for starting and ending spark out, the rate of change v, which is the amount of change per unit time of the outer diameter D of the processed object 1, is used. That is, the timing for starting and ending spark out can be determined by taking into consideration the amount of elastic deformation of the processed object. Here, the reason that the timing for starting spark out can be determined while taking into consideration the elastic deformation of the processed object 1 will be explained with reference to FIG. 2 and FIG. 5. FIG. 2 and FIG. 5 illustrate the change in the outer diameter D of the processed object 1 that is measured in process by gauge heads 5 when the amount of elastic deformation of the processed object 1 due to pressing by the grindstone 4 became large due to degradation of the cutting ability of the grindstone 4 (solid line a), and when the amount of elastic deformation of the processed object 1 is small before degradation of the cutting ability of the grindstone 4 (dashed line b).

In FIG. 2, in order to clarify that the time required for performing spark out from finish grinding changes according to the differences in the amount of elastic deformation of the processed object 1, switching from rough grinding to finish grinding is illustrated such that the timing is the same for when the amount of elastic deformation of the processed object 1 is large and small. Actually, switching from rough grinding to finish grinding is performed when the outer diameter D of the processed object 1 becomes a specified value, so the timing of this switching changes according to the change in the cutting ability of the grindstone 4. The larger the amount of elastic deformation of the processed object 1 is during rough grinding as the cutting ability degrades, the larger the amount that the processed object 1 is elastically restored during spark out becomes, and the amount of grinding in spark out increases. Therefore, the larger the elastic deformation of the processed object 1 is, in order to decreasing the amount of grinding by finish grinding, it is necessary to end finish grinding earlier and switching from finish grinding to spark out earlier (spark out is started when the outer diameter D of the processed object 1 is large).

As can be clearly seen from FIG. 2 and FIG. 5, during finish grinding, when the outer diameter D is the same (for example $D=D_i$), the amount of elastic deformation of the processed object 1 in rough grinding is large, and the rate of change $v_{a1}$ when the amount that the processed object 1 is elastically restored is large is greater than the rate of change $v_{b1}$ when the amount that the processed object 1 is elastically restored is small ($v_{a1}>v_{b1}$). Therefore, the first threshold value $v_1$ that corresponds to the target value $D_1$ is regulated so as to be less than the rate of change $v_{a1}$ when the amount of elastic deformation of the processed object 1 is large, and so as to be equal to or greater than the rate of change $v_{b1}$ when the amount of elastic deformation of the processed object 1 is small ($v_{b1} \leq v_1 < v_{a1}$). Moreover, the first threshold value $v_2$ that corresponds to the target value $D_2$ that is smaller than the target value $D_1$ is regulated so as to be less than the rate of change $v_{b2}$ at the time when the outer diameter D of the processed object 1 is the same as the target value $D_2$ ($v_2 < v_{b2}$) in case that the amount of elastic deformation of the processed object 1 is small. By regulating the target values $D_i$ and the first threshold values $v_i$ in this way, the condition ($v_{a1} > v_1$) for starting spark out in step 6 is satisfied when the outer diameter D of the processed object 1 becomes the same as the target value $D_1$ ($D=D_1$) by finish grinding, so spark out starts.

On the other hand, when the amount of elastic deformation of the processed object 1 is small, the condition ($v_{b1} \leq v_1$) in step 6 is not satisfied (in the case of switching to spark out as is, the outer diameter of the processed object 1 would be larger than the target dimension), so spark out cannot be started and finish grinding continues. As finish grinding is further performed, the outer diameter D becomes small, and when the outer diameter D becomes the same as the target value $D_2$ ($D=D_2$), the condition ($v_{b2} \leq v_2$) in step 6 is satisfied, so spark out starts. In this way, plural target values $D_i$ are set for the outer diameter D, and by setting first threshold values $v_i$ for each of the target values $D_i$ so that the smaller the values of the target values $D_i$ become, the first threshold values $v_i$ that correspond to the target values $D_i$ become small, and it is possible to determine the timing for starting spark out (switching from finish grinding to spark out) while taking into consideration the amount of elastic deformation of the processed object 1.

On the other hand, in determining the end of spark out in this example, spark out ends when the rate of change v becomes less than the second threshold value $v_f$ (practically becomes 0 except in the case of measurement error) regardless of the change in the size of the amount of elastic deformation due to degradation of the cutting ability of the grindstone 4. The rate of change v practically becomes 0 when the elastic deformation of the processed object 1 is released, and the outer-circumferential surface of the processed object becomes smooth. Therefore, when the cutting ability of the grindstone 4 is good and the amount of elastic deformation is small, the time that is required for elastic deformation of the processed object to be released is short, so it is possible to end spark out earlier. However, when the cutting ability of the grindstone 4 is bad, and the amount of elastic deformation is large, the time required for releasing the elastic deformation of the processed object 1 becomes long, and the time for performing spark out can be sufficiently maintained. In this way, in this example, it is possible to determine suitable timing for ending spark out regardless of change in the size of elastic deformation. Therefore, in this example, it is possible to prevent variation in the outer diameter of the processed object 1 at the completion of grinding regardless of change in the amount of elastic deformation of the process object 1 due to change in the cutting ability of the grindstone 4, and it is possible to prevent the time required for grinding from becoming unnecessarily long.

INDUSTRIAL APPLICABILITY

The method and device for grinding a metal annular member of the present invention can be applied not only in the case of performing grinding of the outer-circumferential surface of a metal annular processed object, but can also be applied in the case of grinding the inner-circumferential surface.

EXPLANATION OF REFERENCE NUMBERS

1 Processed object
2 Backing plate
3 Shoe
4 Grindstone
5 Measurement gauge

What is claimed is:

1. A method for grinding a metal annular member, comprising a step of grinding a circumferential surface of a metal annular processed object using a rotating grindstone while measuring a dimension in a radial direction of the processed object in process,
    the grinding comprising a rough grinding, a finish grinding, and a spark out in order,
    wherein a condition for starting the spark out is determined based on a rate of change of the dimension in the radial direction of the processed object, and
    wherein a first threshold value for the rate of change of the dimension in the radial direction of the processed object is determined for each of a plurality of different preset target values for the dimension in the radial direction of the processed object, and when the dimension in the radial direction of the processed object becomes one target value of the plurality of different preset target values, the spark out starts under a condition that an absolute value of the rate of change of the dimension in the radial direction of the processed object becomes greater than the first threshold value that corresponds to the one target value.

2. The method for grinding a metal annular member according to claim 1, wherein a condition for ending the spark out is determined based on the rate of change of the dimension in the radial direction of the processed object, and the spark out ends when an absolute value of the rate of change of the dimension in the radial direction of the processed object becomes less than a second preset threshold value.

3. A device for grinding a metal annular member, comprising:
    a means for supporting and fastening a metal annular processed object and rotating the processed object;
    a means for positioning the processed object in a radial direction;
    a rotating grindstone grinding a circumferential surface of the processed object;
    a sensor measuring an outer diameter of the processed object; and
    a controller controlling a rotation of the rotating grindstone based on a measurement result measured by the sensor; wherein
    when using the rotating grindstone to perform grinding of the circumferential surface of the processed object, the grinding comprising a rough grinding, a finish grinding and a spark out in order, while measuring a dimension in the radial direction of the processed object, the controller determines a timing for starting the spark out based on a rate of change of the dimension in the radial direction of the processed object, and
    wherein, when the dimension in the radial direction of the processed object becomes one target value of a plurality of different preset target values for the dimension in the radial direction of the processed object, the controller compares an absolute value of the rate of change of the dimension in the radial direction of the processed object with one of first threshold values for the rate of change of the dimension in the radial direction of the processed object that are determined for each of the plurality of different preset target values for the dimension in the radial direction of the processed object, the one first threshold value corresponding to one of the target values at a particular time, and starts the spark out under a condition that the absolute value of the rate of change of the dimension in the radial direction of the processed object is greater than the one first threshold value corresponding to the one target value at the particular time.

4. The device for grinding a metal annular member according to claim 3, wherein the controller determines at least one of a timing for starting the spark out or a timing for ending the spark out based on the rate of change of the dimension in the radial direction of the processed object, and the controller ends the spark out when the absolute value of the rate of change of the dimension in the radial direction of the processed object becomes less than a second preset threshold value.

* * * * *